B. F. Field.
Grain Drill.
No. 1,560. Reissued Nov. 3, 1863.
Fig. 1.
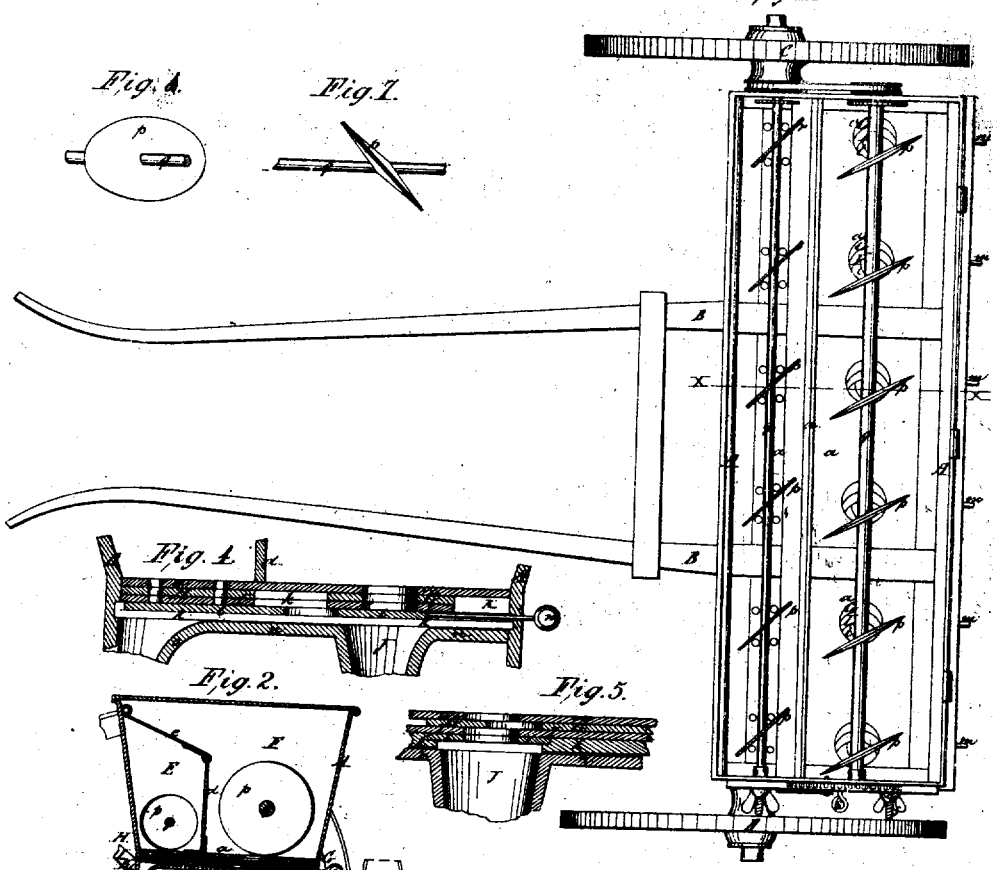
Fig. 6.
Fig. 7.
Fig. 4.
Fig. 2.
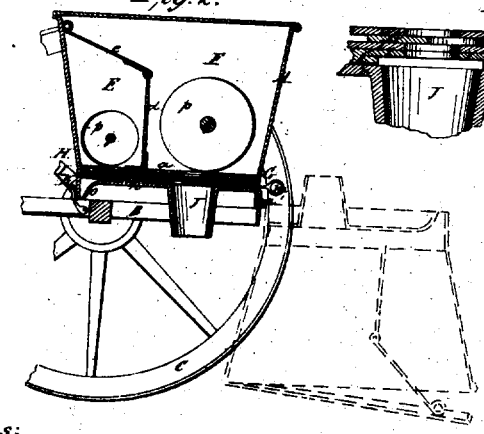
Fig. 5.
Fig. 3.
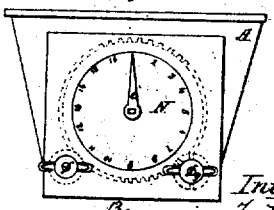
Witnesses:
Thomas J. Gardner
Wm. A. Franklin
Inventor
Benjamin F. Field
By his attorneys
Smith & Serrell

UNITED STATES PATENT OFFICE.

BENJAMIN F. FIELD, OF SHEBOYGAN FALLS, WISCONSIN.

IMPROVEMENT IN GRAIN-DRILLS.

Specification forming part of Letters Patent No. 35,438, dated June 3, 1862; Reissue No. 1,560, dated November 3, 1863.

*To all whom it may concern:*

Be it known that I, BENJ. F. FIELD, of Sheboygan Falls, in the county of Sheboygan and State of Wisconsin, have invented a new and useful Improvement in Seeding-Machines; and I do hereby declare the following to be a full, clear, and exact description of the same, reference being had to the accompanying drawings, making a part of this specification, in which—

Figure 1 is a plan view of my improved machine. Fig. 2 is a vertical longitudinal section taken at the line *x x* of Fig. 1. Fig. 3 is an end view of the seed-hopper. Fig. 4 is a transverse vertical section of the bottom and slides. Fig. 5 is a vertical longitudinal section of a portion of the bottom and slides. Fig. 6 is a view of one of the stirrers, looking in a direction perpendicular to its surface. Fig. 7 is a view of one of the stirrers, showing its oblique position on the shaft.

My invention consists in the means employed for regulating the size of the seed-openings to adapt the machine to sow any given quantity of seed to the acre, in the peculiar construction and arrangement of agitators, in the peculiar construction of seed-hopper, whereby it may be readily emptied in a combination of parts, hereinafter to be described.

To enable others skilled in the art to fully understand and construct my invention, I will proceed to describe it.

A represents the hopper, of usual construction, mounted on the hind end of a frame, B, supported on the wheels C and D. Said hopper is attached at its back and lower edge to the frame B by hinges *a'*, for a purpose hereinafter to be explained. The front bottom edge of the hopper is furnished with a staple or projection, over which a hook attached to the frame B catches, to secure the hopper in its proper position. Underneath the false bottom *a* are measuring and cut-off slides, to be more fully described hereinafter. The hopper on the inside is divided by a partition, *d*, which extends the entire length thereof and about two-thirds the height of the same from the bottom upward, forming two compartments, E and F, of unequal capacity, the one in front and smallest, E, being for grass-seed and the other, F, for grain. The grass-seed compartment E is closed by an inclined cover, *e*, attached by hinges to the top edge of the partition *d*, and resting at its opposite edge against the inner front side of the hopper. The false bottom *a* in each of the compartments of the hopper is furnished with openings, to allow the grain and grass-seed to press through them.

The slide G, under the grain and seed compartment, is made somewhat shorter than the hopper, and is furnished with openings, corresponding in size with those in the bottom of the compartment F, and is attached at one end to a screw, *f*, which is fitted to work through a nut, *g*, fitted in one end of the seed-hopper, said nut being furnished on its periphery with cog-teeth and on its outer end with thumb-pieces, whereby it is rotated and the seed-measuring slide G moved in a direction to cover more or less (as may be desired) of the seed-openings in the false bottom *a* of the grain-compartment F, to adapt the machine to sow any given quantity of grain to the acre. The cogs on the periphery of the thumb-nut *g* mesh into similar cogs on the wheel *h*, (shown in dotted lines in Figs. 1 and 3,) on the outer end of whose axis an index, *i*, is fixed, which, pointing to the figures on the dial, indicates the number of bushels per acre the machine is set to sow.

The measuring-slide H, under the grass-seed compartment E, is perforated to correspond with the openings in its false bottom, and is attached to a screw and operated by a thumb-nut, *j*, in precisely the same manner as the one before mentioned, with the exception that it has no connection with an index.

Covering the under side of the grain and grass-seed measuring-slides is a shut-off slide, I, which is supported by cross-pieces *k*, attached at the opposite ends to the rabbets by screws, or they may be attached in any other suitable manner. The shut-off slide in a central line immediately under the seed-grain openings is furnished with openings of corresponding size, and under the grass-seed openings it is notched, so that when moved in one direction by means of the rod *s* the openings are made to correspond with those in both compartments E and F of the hopper, and when moved in the opposite direction the unperforated portion of the slide is brought under the seed-openings in the false bottom, and they are thereby closed. The object of the latter slide, I, is to enable the operator to stop the flow of seed from the compartments E and F while the machine is being transported to or from the field without having to change or move the measuring-slides, and thus having to adjust the same every time the machine is used.

To enable the farmer to shut off the flow of seed through any one or more of the seed-openings without affecting the others, short slides *l* are fitted transversely of the hopper in rabbets formed in the inner sides of the cross-pieces *k*. These slides have each an opening in them of the same size as the openings in the measuring-slide G, and are moved to one side or the other to cover or uncover the openings in the measuring-slide, as may be desired, by a rod, *m*, attached to one end and protruding through the back side of the hopper.

The true bottom *n* of the hopper at its front edge forms a chute, *o*, to give a forward direction to the grass-seed as it issues from the hopper, and thus prevent it from getting mixed with the grain.

J J are seed-tubes located immediately under the openings in the false bottom *a* and depending from the bottom *n*, for the purpose of conducting the grain into the drills, which may be formed in any of the usual ways.

Each of the compartments E and F is furnished with an agitator or stirrer, composed of plates of any suitable material, *p*, of elliptical form, firmly attached in an oblique position to the revolving shaft *q*, which has its bearings in the ends of the hopper. An ellipsis is used in preference to a circular form, for the reason that during the revolution of the shaft the lowest edge of the former is constantly at the same distance from the surface of *a*, a condition which the circular plate cannot be made to fulfill. This will readily appear when it is considered that the circle and the ellipse are both conic sections, and may therefore be resolved into each other, for if a circular plate is placed before the eye, its surface oblique to the line of vision, its circumference then appears elliptical and conversely. An elliptical figure may be so placed before the eye as to appear circular. This is exactly the position of the plates *p*, which, if viewed from a point on the axis of the shaft *q*, (see Fig. 2,) would appear circular. Hence all points on the circumference of the plate describe equal circles about the center of motion during revolution, whereas a circular plate similarly placed would appear elliptical and different points on its circumference would describe circles of different diameters.

The plates *p* are placed obliquely upon the shaft *q*, for the reason that they then present a surface constantly inclined to the plane of revolution, and, according to well-known mechanical laws, obstructions will be thrust aside instead of being pushed directly forward or crushed, with danger of injury to the machine. The shaft *q* may be so placed that the edges of the stirrer-plates will pass in the closest possible proximity to the bottom *a* and without danger of crushing any of the seed. The shaft *q* is revolved, by means of a band, over the hub of the driving-wheel and a pulley on the end of the shaft, or by any other desirable method.

The grain and grass seed, being placed in their respective compartments of the hopper, are prevented from passing through the seed-openings while the machine is being transported to or from the field by the shut-off slide I, which is moved so as to cover the openings in the measuring-slides.

When it is desired to clean the compartments in the hopper of seed after the machine has been used it is effected by simply unfastening the hopper at the front side and turning it over, as shown by the red lines in Fig. 2, allowing the grain to run out first before unfastening the cover of the grass-seed compartment.

I am aware that a measuring-slide in the hopper of a seeding-machine has been arranged so as to be moved by a screw, and that the said movement of the slide has been made to operate an index, as in the rejected application of Kuhn and Haines, January 13, 1855, and others. I therefore make no such claim. I am also aware that agitators have been made consisting of a series of spiral flanges arranged on the periphery of a drum; also, of one or more serpentine flanges on a drum, and therefore make no claim to such devices; but,

Having thus described my invention, what I claim as new, and desire to secure by Letters Patent of the United States, is—

1. The seed-box or hopper A when so attached to the frame B by hinges or any equivalent device that it may be turned completely upside down, in the manner and for the purpose set forth.

2. The combination of the grain-measuring slide G, screw *f*, thumb-nut *g*, index *i*, and dial N with the bottom *a* and shut-off slide I, when arranged in the manner and for the purpose set forth.

3. The combination of the compartments E F, false bottom *a*, slides G I, tubes J J, and chute *o*, when arranged as described.

4. The agitators consisting of elliptically-formed plates *p*, secured in an oblique position on a horizontal shaft, *q*, arranged to operate in the manner and for the purpose set forth.

BENJAMIN F. FIELD.

Witnesses:

G. S. GRAVES,

C. S. MOORE.